United States Patent
Feuilloley et al.

(10) Patent No.: US 10,913,197 B2
(45) Date of Patent: Feb. 9, 2021

(54) METHOD FOR PRODUCING A MARKED CONTAINER COMPRISING A STEP FOR MARKING A PREFORM

(71) Applicant: SIDEL PARTICIPATIONS, Octeville sur Mer (FR)

(72) Inventors: Guy Feuilloley, Octeville sur Mer (FR); Sebastien Fevre, Octeville sur Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 501 days.

(21) Appl. No.: 14/767,701

(22) PCT Filed: Feb. 13, 2014

(86) PCT No.: PCT/EP2014/052804
§ 371 (c)(1),
(2) Date: Aug. 13, 2015

(87) PCT Pub. No.: WO2014/125014
PCT Pub. Date: Aug. 21, 2014

(65) Prior Publication Data
US 2015/0352772 A1    Dec. 10, 2015

(30) Foreign Application Priority Data
Feb. 14, 2013    (FR) ..................... 13 51271

(51) Int. Cl.
*B29C 49/24*    (2006.01)
*B29D 22/00*    (2006.01)
(Continued)

(52) U.S. Cl.
CPC .......... *B29C 49/24* (2013.01); *B29C 49/4252* (2013.01); *B29D 22/003* (2013.01);
(Continued)

(58) Field of Classification Search
CPC . B29C 49/24; B29C 2049/2477; B29C 49/08; B29C 49/085; B41M 5/267; B29D 22/003
See application file for complete search history.

(56) References Cited

U.S. PATENT DOCUMENTS 3,770,860 A * 11/1973 Amberg et al. ..... B29C 49/0073
264/132
4,131,666 A * 12/1978 Agrawal ................. B29C 49/12
264/291

(Continued)

FOREIGN PATENT DOCUMENTS

EP    2 439 033 A2    4/2012

OTHER PUBLICATIONS

International Search Report, dated Mar. 25, 2014, from corresponding PCT application.

*Primary Examiner* — Matthew J Daniels
*Assistant Examiner* — Andrew D Graham

(57) ABSTRACT

A method for producing a marked container (12), includes the following steps: a first step (E1) of heating, beyond a glass transition temperature, at least one shape-changing portion of the thermoplastic material wall (17) of a preform (14); and a second step (E2) of forming the container by injecting a pressurized fluid into the body (16) of the preform (14) such as to change the shape of the heated portion of the wall (17) by stretching it; and a step (E0) for marking the preform (14), during which a mark (39) is provided on the shape-changing portion of the wall (17) such that the mark (39) is stretched at the same time as the wall (17), during step (E2) after forming.

10 Claims, 2 Drawing Sheets

(51) Int. Cl.
*B29C 49/42* (2006.01)
*B29K 67/00* (2006.01)
*B29L 31/00* (2006.01)
*B29K 105/00* (2006.01)

(52) U.S. Cl.
CPC .......... *B29B 2911/1402* (2013.01); *B29B 2911/1404* (2013.01); *B29B 2911/14026* (2013.01); *B29B 2911/14033* (2013.01); *B29B 2911/14106* (2013.01); *B29B 2911/14133* (2013.01); *B29K 2067/003* (2013.01); *B29K 2105/258* (2013.01); *B29L 2031/712* (2013.01)

(56) References Cited

U.S. PATENT DOCUMENTS

| | | | | |
|---|---|---|---|---|
| 4,323,411 A * | 4/1982 | Uhlig | ......... | B29C 49/18 156/244.14 |
| 4,481,314 A * | 11/1984 | Rule | ......... | C08K 5/18 252/587 |
| 4,654,290 A * | 3/1987 | Spanjer | ......... | B41M 5/267 257/789 |
| 5,300,350 A * | 4/1994 | Grosser | ......... | B41M 5/267 252/962 |
| 5,320,789 A * | 6/1994 | Nishii | ......... | B29C 59/16 264/122 |
| 5,685,939 A * | 11/1997 | Wolk | ......... | H01L 23/49883 156/234 |
| 5,760,120 A * | 6/1998 | Itoh | ......... | B41M 5/267 524/430 |
| 5,826,588 A * | 10/1998 | Forman | ......... | A61M 25/1029 128/898 |
| 5,840,223 A * | 11/1998 | Feuerherm | ......... | B29C 47/0023 264/40.1 |
| 5,976,411 A * | 11/1999 | Feng | ......... | C08K 3/32 252/301.35 |
| 6,017,972 A * | 1/2000 | Harris | ......... | B41M 5/267 219/121.69 |
| 6,740,283 B2 * | 5/2004 | Matsui | ......... | B29C 45/0025 264/132 |
| 7,005,603 B2 * | 2/2006 | Addington | ......... | G09F 3/00 219/121.69 |
| 2003/0004535 A1 * | 1/2003 | Musbach | ......... | A61F 2/958 606/194 |
| 2003/0130381 A1 * | 7/2003 | Joachimi | ......... | B29C 65/1635 524/88 |
| 2003/0234286 A1 * | 12/2003 | Labrec | ......... | B41M 3/14 235/380 |
| 2004/0059068 A1 * | 3/2004 | Nodera | ......... | C08G 64/186 525/474 |
| 2004/0101642 A1 * | 5/2004 | Quillen | ......... | C08K 3/04 428/35.7 |
| 2004/0198858 A1 * | 10/2004 | Labrec | ......... | B41M 5/24 522/2 |
| 2006/0263554 A1 * | 11/2006 | Yamada | ......... | B32B 1/02 428/35.7 |
| 2006/0280825 A1 * | 12/2006 | Cochran | ......... | B29B 13/023 425/174.4 |
| 2007/0085334 A1 * | 4/2007 | Watanabe | ......... | B42D 25/328 283/72 |
| 2007/0096352 A1 * | 5/2007 | Cochran | ......... | B29B 13/023 264/40.6 |
| 2007/0154642 A1 * | 7/2007 | Klein | ......... | B41M 5/267 427/299 |
| 2008/0099961 A1 * | 5/2008 | Feuilloley | ......... | B29B 13/024 264/405 |
| 2010/0019414 A1 * | 1/2010 | Humele | ......... | B23K 26/0838 264/400 |
| 2010/0104697 A1 | 4/2010 | Kriegel et al. | | |
| 2010/0291331 A1 * | 11/2010 | Schaefer | ......... | B29C 45/14688 428/35.7 |
| 2011/0089135 A1 * | 4/2011 | Simon | ......... | B65D 1/40 215/379 |
| 2011/0207328 A1 * | 8/2011 | Speakman | ......... | H01L 51/0011 438/694 |
| 2012/0085071 A1 * | 4/2012 | Hahn | ......... | B29C 49/6436 53/411 |
| 2012/0088060 A1 * | 4/2012 | Huettner | ......... | B29B 11/14 428/80 |
| 2013/0193622 A1 * | 8/2013 | Feuilloley | ......... | B29B 13/024 264/458 |

* cited by examiner

METHOD FOR PRODUCING A MARKED CONTAINER COMPRISING A STEP FOR MARKING A PREFORM

The invention relates to a method for obtaining a marked container.

The invention relates more particularly to a method for obtaining a marked container comprising the following steps:

a first step of heating beyond a glass transition temperature of at least a portion to be deformed of the wall of thermoplastic material of a preform;

a second step of forming the container by injection of a fluid under pressure into the body of the preform so as to deform by stretching the heated portion of the wall.

It is known how to make information and decorations appear on containers, particularly bottles made of plastic material.

The information appearing on a container can, for example, be related to the expiration date of the contents or the formula of the product contained in the container.

The decorations can, for example, represent the logo of the manufacturer of the product.

It is well known how to make this information and these decorations appear on paper or plastic labels. The labels are glued on the final container after the step of forming the container, i.e., when the containers are shaped into their final shape.

The labeling, however, has many drawbacks.

Thus, the manufacturing of the labels, their printing and their gluing onto the containers represent a high cost, particularly for mass-produced containers.

In addition, the label may be torn off during the handling of the container. The final user is then no longer able to access certain important information, such as the expiration date.

Further, the recycling of containers made of plastic material is complicated by the presence of the label and the glue.

For the inscription of important information, methods for marking the wall of the container have already been proposed.

Thus, it is known how to print directly on the wall of the container certain important information using a special ink.

Nevertheless, this method of marking by printing is not satisfactory because, for reasons of hygiene, the ink used for the marking must dry almost instantaneously, and it must also remain on the surface of the wall without penetrating inside the container by a phenomenon of migration. Consequently, the ink has a specific composition that is very costly to produce.

Further, the use of ink also complicates the methods for recycling the plastic containers.

To work around these problems, a method of marking by engraving the wall of the container has also been proposed. Engraving is generally performed using a carbon dioxide laser. Such a marking method is performed by removing material on the wall of the container, particularly by evaporation. As a result, the wall locally exhibits a reduced thickness.

However, in the interest of savings and of ecology, the thickness of the wall of the containers is sought to be reduced. Thus, it is possible to make a container by using less plastic material than before. Now, the removal of material on a very thin wall risks weakening the wall to the point of puncturing the container with the least stress.

To solve these problems while remaining compatible with mass-produced containers, this invention proposes a method for obtaining a marked container of the type described above, characterized in that it comprises a step for marking the preform during which a mark is made on the portion of the wall to be deformed so that the mark is stretched at the same time as the wall during the subsequent forming step.

According to other characteristics of the method:

the mark is made by changing the opacity of the material that constitutes the wall of thermoplastic material of the preform;

the mark is made using a laser that emits a beam;

the laser beam is emitted at a power that is less than an ablation threshold beyond which the laser beam begins to hollow out the wall;

the mark is formed by carbon particles that are visible to the naked eye and that are produced by local heating of the material in the thickness of the wall using the laser;

the thermoplastic material consists of "PET," and the laser beam has a wavelength within the short infrared, particularly 1064 nm;

the mark is obtained by a photochemical reaction between the thermoplastic material that constitutes the wall of the preform and the laser beam;

the thermoplastic material consists of "PET" and the laser beam has a wavelength within the near ultraviolet, particularly 355 nm;

the mark inscribed on the preform during the marking step is deformed by anamorphosis in relation to a master pattern of a mark to be obtained on the final container so as to take into account the stretching of the wall during the forming step;

the marking step occurs prior to the heating step.

The invention also relates to an installation for implementing the method according to the invention, characterized in that it comprises:

marking means that are able to have their parameters set;

control means that are able to record an image of the mark present on a container at the end of the forming step;

an electronic control unit in which a master pattern of the final mark to be obtained is stored, the electronic control unit being able instantaneously to adapt the configuring of the marking means as a function of the image of the mark obtained by the imaging means to obtain marks on the following containers that are in conformity with the master pattern.

According to another characteristic of the installation, the marking means consist of an Nd—YAG laser.

Other characteristics and advantages of the invention will be brought out upon reading the following detailed description for the understanding of which reference will be made to the accompanying drawings among which:

In the description below, elements exhibiting an identical structure or similar functions will be referred to with the same reference number.

In the description below, the following directions will be adopted in a nonlimiting way:

longitudinal, directed from back to front and referred to by the arrow "L" in the figures;

vertical, directed from bottom to top and referred to by the arrow "V" in the figures;

transverse, directed from left to right and referred to by the arrow "T" in the figures.

Figure 1:
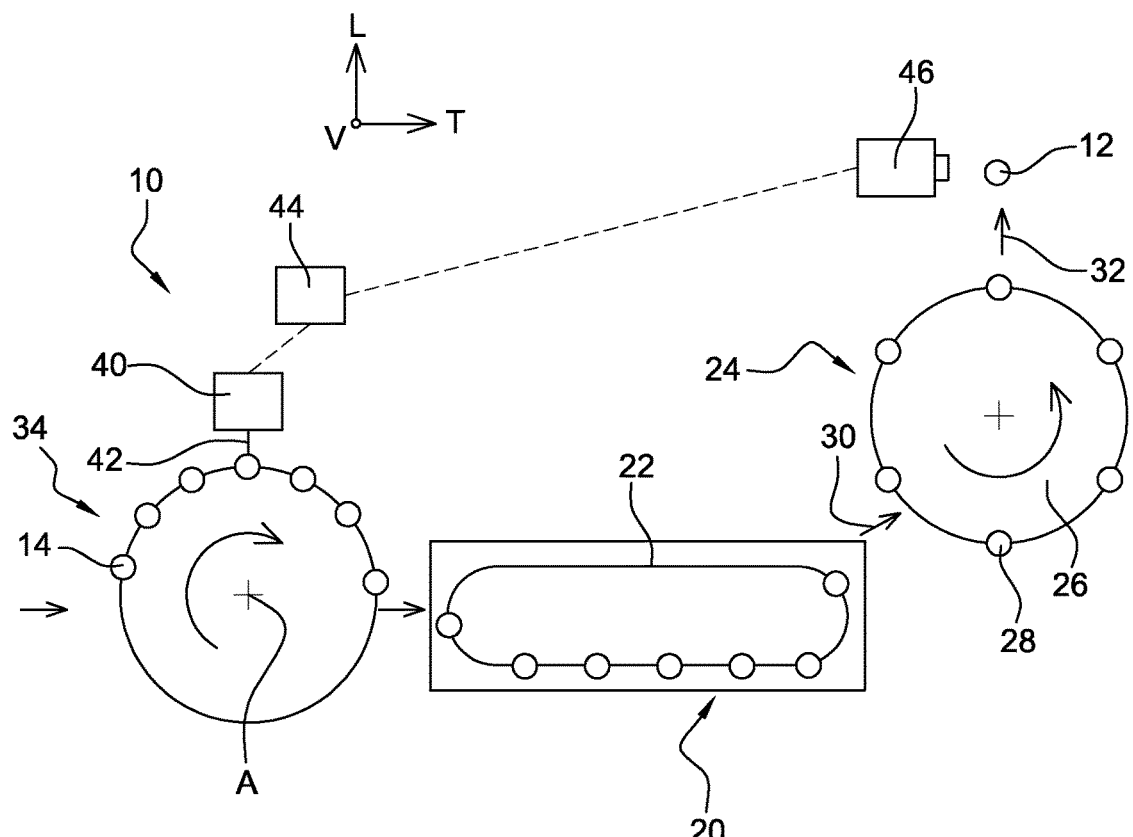
FIG. 1 is a top view that diagrammatically shows an installation for manufacturing marked containers for implementing the method according to the invention.

Shown diagrammatically in FIG. 1 is an installation 10 for mass production of containers 12 made of thermoplastic material. In a nonlimiting way, the containers 12 here are bottles, and the thermoplastic material consists of polyethylene terephthalate, referred to hereafter with its acronym "PET."

The final containers 12 are obtained by hot forming of preforms 14 of thermoplastic material.

Below, the term "preform 14" will be used to refer to the container before the forming step.

Figure 4:
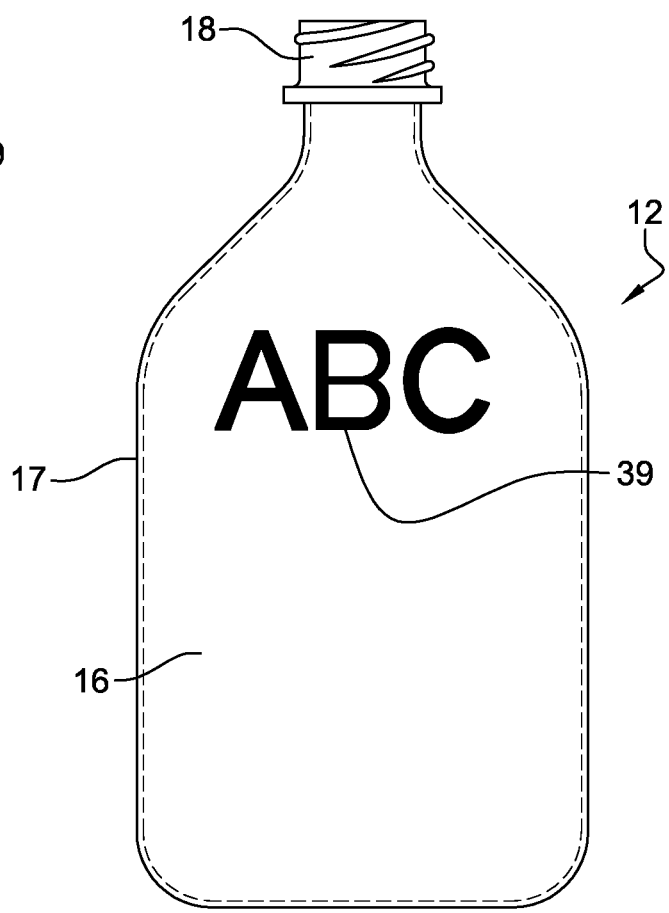
FIG. 4 is a front view that shows the container obtained by forming from the preform of FIG. 3.

Such preforms 14 are generally obtained by injection. As shown in FIG. 4, they have a cylindrical body 16 with a tubular wall 17 that is closed at one of its axial ends and that is extended at its other end by a neck 18, which is itself also tubular. The wall 17 is delimited by an outer face and by an inner face. The neck 18 is generally injected so as to have already its final shape while the body 16 of the preform 14 is destined to undergo a relatively considerable deformation to form the final container 12 during a forming step.

Referring to FIG. 1, the installation 10 comprises a station 20 for heating the preforms 14. By way of nonlimiting example, the heating station 20 consists of a tunnel in which heating means (not shown) are arranged, means such as infrared lamps or means for emitting microwave radiation. A means 22 for conveying preforms 14 is arranged so as to make the preforms 14 pass alongside the heating means from an entrance to an exit of the tunnel.

The direction of passing of the preforms 14/containers 12 is indicated by the arrows of FIG. 1.

As a variant, the heating station is made of individual cavities equipped with heating means and that each accommodate a preform.

At their exit from the heating station 20, the part to be deformed of the preforms 14, generally the body 16, is rendered malleable by heating beyond a glass transition temperature, while the parts that are not deformed, in general the neck 18, are kept at a sufficiently low temperature so as to preserve their original shape.

The installation 10 also comprises a station 24 for forming the preforms 14 thus heated. The forming station 24 is arranged downstream from the heating station in reference to the flow of the preforms 14 in the installation 10.

The forming station 24 here exhibits the form of a carousel 26 that carries a plurality of forming positions 28. Each forming position 28 is thus able to be moved around the axis of the carousel 26 between a point 30 for loading the hot preforms 14 and a point 32 for offloading the final containers 12 before resuming a new cycle.

Here, these are positions 28 for forming by stretch-blow molding of the preforms 14.

For this purpose, each forming position 28 comprises a removable mold (not shown) that delimits a molding cavity. The molding cavity is intended to receive a preform 14 that is exiting still hot from the heating station 20. Each forming position 28 also comprises a nozzle (not shown) associated with blow molding or stretch-blow molding that is intended to impart to the container 12 its final shape by flattening the malleable walls of the preform 14 against the walls of the molding cavity by injection of a fluid under pressure through the neck 18 of the preform 14. The malleable walls of the preform 14 thus undergo a stretching that reduces their thickness.

With regard to positions 28 for forming by blow molding, the fluid is generally formed by a gas under pressure.

It will be understood, however, that the invention is also applicable to other types of forming positions, particularly positions for forming by injection of a liquid under pressure into the preform 14.

During the step for forming the containers 12, the carousel 26 is driven by a rotational movement to enable the movement of the preforms 14/final containers 12 from the loading point 30 to the off-loading point 32. Thus, a new preform 14 can begin the forming step while the preceding preform 14 has not yet finished its forming cycle. This makes it possible to maintain a high rate for the mass production of the containers 12.

The installation 10 also comprises a station 34 for marking the preforms 14 that is arranged upstream from the forming station 24 in the direction of the flow of a preform 14. The marking station 34 here is arranged upstream from the heating station 20 in reference to the flow of the preforms 14 indicated by the arrows of FIG. 1, so that the preforms 14 are heated after they are marked.

Figure 2:
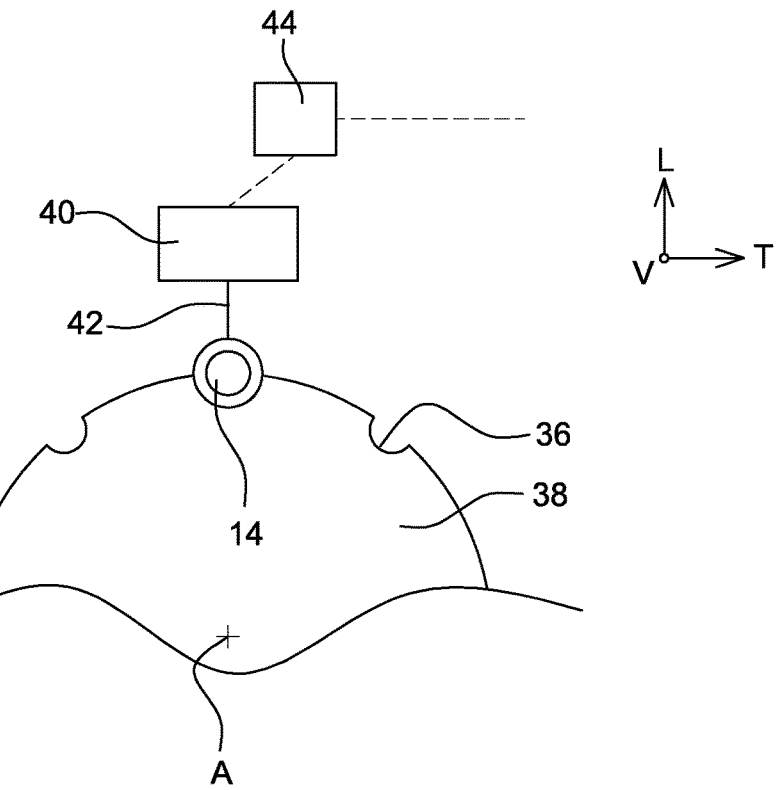
FIG. 2 is a top view that shows a marking station of the installation of FIG. 1.
Figure 3:
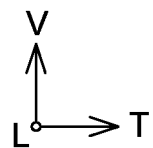
FIG. 3 is a front view that shows a marked preform at the exit from the marking station.
Figure 3:
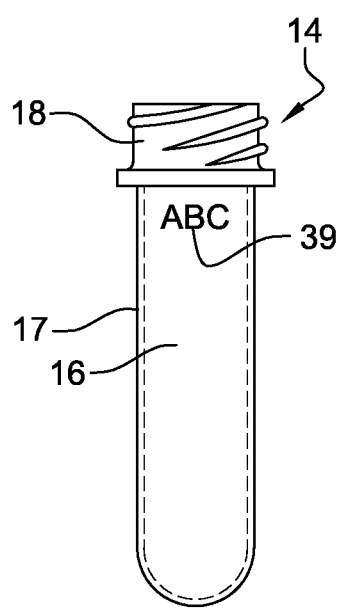

As illustrated in FIG. 2, the marking station 34 comprises a support 36 for a preform 14, with regard to, for example, clamps or slots located on the periphery of a transfer wheel 38 mounted to rotate around a vertical axis "A."

The marking station 34 further comprises means whose parameters can be set to mark the wall 17 of the preform 14. These means thus make it possible to inscribe a mark 39 inside the wall 17 of the preform 14 and/or on one of the inner or outer faces of the wall 17.

With regard to preforms 14 made of a transparent or at least translucent thermoplastic material, the means here make it possible to change the opacity of the material that constitutes the wall 17 of thermoplastic material of the preform 14.

As a variant, the marking means make it possible to change the color of the thermoplastic material.

Preferably, the marking means do not remove material on the wall 17 of the preform 14. Thus, the wall 17 of the container 12 obtained after forming has a homogeneous thickness, including in the marked area. The wall 17 of the container 12 is thus as break-resistant in its marked part as in its unmarked parts. In addition, this makes it possible to mark preforms 14 intended to become containers 12 having very thin walls 17.

In the example shown in FIGS. 1 and 2, the marking means comprise a laser 40. More particularly, this is a laser 40 that is able to emit a power beam 42 that is less than an ablation threshold beyond which the laser 40 begins to hollow out the wall 17.

The laser 40 comprises controlled means (not shown) to move the emitted beam 42, for example by means of mobile lenses and/or a mobile mirror in relation to the support 36. Thus, the support 36 makes it possible to convey the preform 14 into a marking position located opposite the laser 40. The preform 14 is then immobilized long enough for the laser beam 42 to draw the mark 39 on the immobile wall 17 by moving. The movement of the laser beam 42 is thus controlled like a pencil to inscribe the mark 39 on the wall 17 of the preform 14.

The means for controlling the movement of the laser beam consist of an electronic control unit 44 that is able to be configured at will to change the mark 39 to be inscribed; for example, it is a digital control. The parameters to be changed relate to, for example, the coordinates of movements of the beam 42, the speed of movement of the beam 42, etc.

As a variant that is not shown, the containers are not immobilized. The laser is then controlled while taking into account the movement of the preform. In this case, the marking performed is called "Cartesian," i.e., the laser performs a solely vertical sweep relative to a fixed reference point, while the preform passes by horizontally relative to said fixed reference point; thus, the two vertical and horizontal axes are covered by the laser beam. This variant is particularly suited to small-scale marks that are made in a relatively short period of time relative to the speed of advance of the preforms in front of the laser.

According to another variant, not shown, of the invention, a laser is associated with each slot of the wheel so as to mark individually each preform loaded on the associated slot. Thus, each laser accompanies the rotation of the wheel to allow a continuous marking without slowing down the flow of the preforms.

The laser 40 can draw the mark 39 either according to a vector method, i.e., by continuous drawing, or according to a matrix method, i.e., by drawing point by point.

As a variant that is not shown, the marking is performed by projecting a wide laser beam through a mask.

Here, it is a neodymium-doped yttrium-aluminium garnet laser 40, better known under the name "Nd—YAG laser." Such a laser 40 typically emits a beam 42 in the short infrared range, particularly with a wavelength of 1064 nm. An example of such a laser 40 is in particular marketed by the "TRUMPF" company under the name "TruMark 6000."

The beam 42 can be emitted in pulsed or continuous mode depending on the characteristics of the thermoplastic material constituting the walls of the preform 14. In all cases, it is preferable that the laser 40 be adjusted so that the instantaneous power of the emitted beam 42 does not exceed the ablation threshold so as to prevent the wall 17 from being engraved.

It has been found that the areas of wall 17 of "PET" targeted by the laser beam 42 in the near infrared range with a power and/or an exposure time that is suitable are subjected to a phenomenon known as "carbonization." The carbonization is reflected by the appearance, in the thickness of the wall 17, of particles (not shown) of carbon that are visible to the naked eye. These carbon particles are produced by the local heating of the material until it carbonizes.

The mark 39 is thus formed by carbon particles. The density of carbon particles depends in particular on the power to which the wall 17 is subjected. Thus, by exposing the wall 17 at greater length and/or by increasing the instantaneous power of the emitted beam 42, it is possible to obtain a very dark marking of the preform 14. The adjustment of the laser 40 to obtain a mark 39 by carbonization and without ablation of material is easily achievable by a person skilled in the art.

Of course, a similar result can be obtained by adapting the wavelength of the beam as a function of the thermoplastic material selected. Thus, a laser must be chosen that emits a laser beam that is sufficiently absorbed by the selected material to cause enough local heating.

Depending on the type of marking sought, a laser 40 can also be selected that emits a beam 42 of different wavelengths.

As a variant, the Nd—YAG laser emits a laser beam 42 with a wavelength of 532 nm that emits in the visible range, more precisely in the color green.

Such a laser beam 42 makes it possible to obtain a less pronounced carbonization of the wall 17 of the preform 14 that has a lower density of carbon particles. This is reflected by a lighter mark 39 that appears gray to the naked eye.

According to still another variant of the invention, the Nd—YAG laser 40 emits a beam 42 with a wavelength in the near ultraviolet, for example 355 nm.

It has been observed that on contact with the ultraviolet laser beam 42, the wall 17 of "PET" of the preform 14 underwent a photochemical reaction. In this particular case, this photochemical reaction between the laser beam 42 and the "PET" material is reflected by the appearance of an opaque mark 39 in a light shade, derived from, for example, a phenomenon of breaking polymer chains. In contrast with the marks 39 obtained by carbonization, the mark 39 obtained by photochemical reaction appears on the outer surface of the wall 17 of the preform 14, without altering the structure of the material in the thickness of the wall 17.

According to other variants, not shown, of the invention, other laser types can be used within the scope of this invention. As explained previously, the laser is selected and adjusted to make it possible to mark the wall of thermoplastic material, on the surface or deeper, without, however, engraving the wall.

The installation 10 thus described is implemented by a method for obtaining a marked container 12 comprising the following steps.

During a step "E0" prior to marking, the preform 14 is conveyed to the marking station 34 so that the mark 39 is made on or inside the portion of the wall 17 to be deformed.

Then, during a first heating step "E2," the preform 14 is conveyed from the marking station 34 to the heating station 20. The parts to be deformed of the wall 17 of the preform 14 are then heated in the oven beyond a glass transition temperature. Thus, the portion of marked wall 17 is thereby heated beyond its glass transition temperature.

Finally, during a second step "E2" for forming the container 12, the preform 14 is conveyed from the heating station 20 to the forming station 24. It is received in the mold, and the fluid under pressure is injected into the body 16 of the preform 14 so as to deform by stretching the heated portion of the wall 17. A stretching by a stretching rod can be performed simultaneously with the blow-molding operation. During this forming step "E2," the preform 14 is thus shaped into a container 12 exhibiting its final shape.

The mark 39 is therefore stretched at the same time as the wall 17 during this forming step "E2." The mark 39 inscribed during the preceding marking step "E0" therefore undergoes, during the forming step "E2," a stretching that is reflected mathematically by a transformation called "anamorphosis."

When the mark 39 is obtained by carbonization, it becomes slightly grayer because of the distance from each other of the carbon particles during the stretching. Nevertheless, it has been found that this mark 39 remained perfectly visible to the naked eye.

So that the mark 39 of the final container 12 is in conformity with a master pattern desired by the manufacturer, the shape of the mark 39 before forming is determined by applying to the desired master pattern a transformation by anamorphosis that is opposite the one undergone during the forming step "E2."

Further, to ensure that the final mark 39 is precisely in conformity with the desired master pattern, the installation 10 advantageously comprises control means that are able to record an image of the mark 39 at the end of the forming operation. In the example shown in FIG. 1, a camera 46 is installed at the exit from the forming station 24.

This camera 46 transmits to the electronic control unit 44 a digital image of the marks 39 that are actually present on the final containers 12. A master pattern of the mark 39 to be obtained after the forming step "E2" is stored in the electronic control unit 44. The electronic control unit 44 then uses a method for comparing images, an example of which is described in the document EP-B1-1,145,568. This method thus makes it possible to instantaneously adapt the configuring of the marking means to obtain marks on the following containers 12 that are in conformity with the master pattern.

As a variant, the prior marking step is interposed chronologically between the first step of heating and the second step of forming. In this case, the marking station is naturally arranged between the heating station and the forming station in reference to the flow of the containers/preforms.

According to another variant, not shown, of the invention, intermediate steps are interposed between the first step of heating and the second step of forming. For example, it involves a thermal conditioning step during which different areas of the body of the preform are treated thermally in an individual manner to make possible a non-homogeneous deformation of the preform during the forming step. In this case, it will be understood that the invention is also applied to the marking step described previously when it occurs before or after any one of the intermediate steps. The invention actually relates to such a step for marking the preform that occurs before the forming step.

The method for obtaining marked containers made according to the teachings of the invention thus makes it possible to obtain marked containers without using labels and without weakening the wall because of the absence of engraving.

In addition, the fact of performing the marking on the preform before the forming step "E2" makes it possible to reduce very significantly the time of the marking step "E0." Actually, the mark 39 inscribed on the preform 14 is intended to be stretched and therefore enlarged during the forming step "E2."

It has been found by experience that by using the same marking means, here an Nd-YAG laser, at least 60 times more time was necessary to inscribe a given mark directly onto the final container than was necessary to obtain the same mark by using the method performed according to the invention. This is because the surface to travel over to mark the final container is much greater than the surface to travel over to mark the preform.

Thus, the method performed according to the teachings of the invention makes it possible further to obtain marked containers with a rate suitable for the mass production of containers.

The invention claimed is:

1. A method for obtaining a series of marked containers (12) from a series of preforms (14), each preform comprising PET material and including a preform axis and a preform body (16) to be deformed for obtaining the marked container (12), the preform body (16) including a wall (17), the method comprising storing a master pattern of a mark of the marked container to be obtained and comprising the following steps for each preform:
    a first heating step (E1) of heating at least a portion, of the wall (17) of the preform body beyond a glass transition temperature of the PET material;
    a second stretch-blow molding step (E2) of stretch-blow molding the container by injection of a fluid under pressure into the preform body (16) for radially expanding the preform body and by using a stretching rod for axially stretching the preform body so as to deform the heated portion of the wall (17);
    prior to said stretch-blow molding step (E2), a marking step (E0) of marking the preform (14) during which a mark (39) is made on the portion of the wall (17) of the preform body to be deformed during said stretch-blow molding step (E2), so that the mark (39) is stretched at the same time as the wall (17) during the subsequent stretch-blow molding step (E2) such that the mark (39) made on the portion of the wall (17) of the preform body, after said stretching, has a shape that corresponds to a shape of the master pattern,
    the mark (39) being made on the portion of the wall (17) of the preform body by is made by local heating of the PET material at the portion of the wall (17) of the preform body using a laser (40) that emits a beam (42) at a power that is less than an ablation threshold beyond which the laser beam (42) begins to hollow out the wall (17) of the preform body;
    wherein the method further includes regulating the mark (39) provided on a further preform of the series of preforms depending on a comparison with the master pattern of an image of the marked container;
    wherein the marking step of each preform, the heating step of each preform, and the stretch-blow molding step of each container are performed by a single installation.

2. The method according to claim 1, wherein, in the marking step (E0), the mark (39) is made by changing an opacity of the PET material that constitutes the wall (17) of the preform body.

3. The method according to claim 1, wherein,
    the mark (39) consists essentially of visible carbon particles that are naked eye visible, and
    in the marking step (E0), said local heating of the PET material in a thickness of the wall (17) of the preform body using the laser (40) produces the carbon particles.

4. The method according to claim 3, wherein, in the marking step (E0), the laser beam (42) has a wavelength within the short infrared spectrum.

5. The method according to claim 1, wherein, in the marking step (E0), the mark (39) is obtained by a photochemical reaction between the PET material of the wall (17) of the preform body and the laser beam (42).

6. The method according to claim 5, wherein, in the marking step (E0), the laser beam (42) has a wavelength within the near ultraviolet spectrum.

7. The method according to claim 1, wherein, using the master pattern of the container to be obtained, the mark (39) that is made on the portion of the wall (17) of the preform body during the marking step (E0) is defined by anamorphosis in relation to the master pattern of the mark (39) of the marked container to be obtained, taking into account the subsequent expansion of the wall (17) during the stretch-blow molding step (E2) such that, after said stretching, the shape of the mark made on the portion of the wall (17) of the preform body is in conformity with the shape of the master pattern.

8. The method according to claim 1, wherein the marking step (E0) occurs prior to the heating step (E1).

9. The method according to claim 4, wherein, in the marking step (E0), the laser beam (42) has a wavelength of about 1064 nm.

10. The method according to claim 6, wherein, in the marking step (E0), the laser beam (42) has a wavelength of about 355 nm.

* * * * *